United States Patent [19]

Graham et al.

[11] Patent Number: 4,508,435

[45] Date of Patent: Apr. 2, 1985

[54] AIR VACUUM CHUCK FOR A MICROSCOPE

[75] Inventors: Marshall D. Graham, Framingham; Dudley D. Cook, Jr., Acton; Donald L. Gecks, Bedford; Robert Shaw, Concord, all of Mass.

[73] Assignee: Coulter Electronics, Inc., Hialeah, Fla.

[21] Appl. No.: 390,049

[22] Filed: Jun. 18, 1982

[51] Int. Cl.³ .............................................. G02B 21/24
[52] U.S. Cl. ..................................... 350/529; 350/531
[58] Field of Search ............... 350/529, 530, 531, 532, 350/533, 534, 535, 536

[56] References Cited

U.S. PATENT DOCUMENTS

| | | | |
|---|---|---|---|
| 3,641,648 | 2/1972 | Kalberman | 350/532 X |
| 3,826,558 | 7/1974 | Rasberry et al. | 350/531 |
| 3,848,962 | 11/1974 | Nelson | |
| 4,040,736 | 8/1977 | Johannsmeier | 350/399 X |
| 4,285,568 | 8/1981 | Elgart | 350/532 X |

FOREIGN PATENT DOCUMENTS

| | | |
|---|---|---|
| 1227821 | 4/1971 | United Kingdom . |
| 1336067 | 11/1973 | United Kingdom . |
| 1365416 | 9/1974 | United Kingdom . |
| 1482654 | 8/1977 | United Kingdom . |
| 1531429 | 11/1978 | United Kingdom . |
| 1588090 | 4/1981 | United Kingdom . |

Primary Examiner—John K. Corbin
Assistant Examiner—Lynn Vandenburgh Kent
Attorney, Agent, or Firm—Lahive & Cockfield

[57] ABSTRACT

An air vacuum chuck for a microscope includes a body member having a planar slide-supporting surface. Stop members are adapted to align a slide in a predetermined orientation. Air ports and vacuum ports in the slide-supporting surface selectively couple a relatively high pressure air reservoir and a vacuum reservoir, respectively, to the region between the slide-supporting surface and the object-bearing surface of the slide. The air ports are adapted to provide airflow directed towards at least one of the stop members. In an alignment mode, airflow from the air ports and vacuum from the vacuum ports establish a vacuum-retained air-bearing with a substantially frictionless coupling between a slide and the slide supporting surface. The vacuum from the vacuum ports controls the separation between the slide and the slide-supporting surface. The directed airflow imparts a net force on the slide, positioning the slide against the stop members. In a support mode, vacuum from the vacuum ports retains the slide with its object-bearing surface held against the slide-supporting surface.

11 Claims, 5 Drawing Figures

AIR VACUUM CHUCK FOR A MICROSCOPE

REFERENCE TO RELATED APPLICATION

The subject matter of this application is related to that of U.S. application Ser. No. 390,048, filed on even date herewith, entitled "Optical Microscope System".

BACKGROUND OF THE INVENTION

The present invention is in the field of optical instruments and more particularly, optical microscopes.

Optical microscopes have long been adapted for viewing objects on planar surfaces of glass slides. Such microscopes generally include a device for holding the object-bearing slide surfaces substantially parallel to the focal plane of the optics such that the position of the slide might be adjusted along the optical axis. To achieve this slide supporting function, it is known in the prior art to use a vacuum chuck for supporting a slide against a slide registration surface substantially parallel to the focal plane in an optical microscope, for example, as taught in U.S. Pat. No. 3,848,962. This type of slide mounting apparatus permits satisfactory support for a slide, maintaining the object-bearing surface in a plane parallel to the focal plane for slides having varying wedge, or thickness and coverslip thickness.

However, in many applications it is also necessary for an object-bearing slide that a desired alignment (in the focal plane) may be repetitively achieved. This is particularly necessary for automated microscopy systems in which a particular location on a slide may be re-accessed a number of times. Moreover, particularly in automated systems, it is generally necessary to be able to release a slide from its fixed (for viewing) position so that off-loading may be achieved.

It is an object of the present invention to provide an improved apparatus for supporting a microscope slide.

It is another object to provide an apparatus for selectively aligning and supporting a microscope slide.

It is yet another object to provide an apparatus for controlling a microscope slide position to permit off-loading.

SUMMARY OF THE INVENTION

The present invention is a chuck system for selectively aligning and supporting an object-bearing planar surface of a microscope slide. The chuck includes a body member having a substantially planar slide-supporting surface. In one form of the invention, a plurality of stop members extend from this slide-supporting surface. Alternatively, the stop members may extend from a fixture attached to the objective lens assembly (or other portion) of the optics system. The stop members are adapted to interferingly engage a slide having its object bearing surface adjacent to the slide-supporting surface with the slide being in a predetermined orientation. In forms of the invention having stop members extending from a fixture connected to the objective lens assembly, the stop members may be retractable. In that form, once desired alignment is achieved and a slide is rigidly coupled to the slide supporting surface, the stop members are retracted so that the chuck (and slide) may be moved as a unit.

A plurality of air ports and vacuum ports are positioned in the slide supporting surface of the body member. The body member includes internal passageways coupled to the various ports which are adapted to couple the air ports to an external relatively high pressure air reservoir and the vacuum ports to an external vacuum reservoir. At least one of the air ports is adapted to direct airflow from that port directed towards at least one of the stop members. In some forms of the invention, at least one of the air ports is adapted to direct airflow from that port away from at least one of the stop members.

A controller is selectively operable in an ALIGNMENT mode to couple air from the air reservoir to the air ports and for coupling vacuum from the vacuum reservoir to the vacuum ports, establishing a vacuum-retained air bearing. With this configuration, in the alignment mode, the airflow from the air ports and between the slide and the slide supporting surface establishes a relatively frictionless coupling between the object-bearing surface of the slide adjacent to the slide supporting surface and that surface. The vacuum from the vacuum ports establishes an equilibrium separation between the object-bearing slide surface and the slide supporting surface. Moreover, the airflow component from the air ports which is directed towards one or more of the stop members, imparts a net force on the slide in a plane parallel to the object bearing surface and towards at least one of the stop members. By way of example, the net force may either be a viscous drag force over the surface of the slide, or a direct force imparted by the airflow against an edge of the slide, or a combination of both. In response to this latter component, a slide adjacent to the slide supporting surface may readily be aligned to the predetermined orientation defined by the stop members.

The controller is selectively operable in a SUPPORT mode for coupling a vacuum from the vacuum reservoir to the vacuum ports. In this case, with no air pressure provided to the air ports, the vacuum from the vacuum ports establishes a net force on a slide adjacent to the slide-supporting surface directed toward that surface. Consequently, in this mode, the slide is held firmly against the slide-supporting surface in the aligned position established during the ALIGNMENT mode. The vacuum is maintained as the controller switches from the ALIGNMENT mode to the SUPPORT mode, so that the slide portion is maintained during that switching time.

The controller may also be selectively operable in a RELEASE mode to couple air from the air reservoir to the air ports in order to release the slide for off-loading. In forms of the invention including a second set of air ports in the slide supporting surface adapted for directing air flow away from the stop members, during the ALIGNMENT mode, the controller couples air to all air ports except those in the second set, permitting alignment as described above. In the RELEASE mode, the controller couples air to all air ports except those adapted for directing air flow towards one or more stop members. In this latter mode, the controller may also couple vacuum to the vacuum ports. As a result, a vacuum-retained air bearing is established with a net force applied to the slide away from the stop members to provide off-loading.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
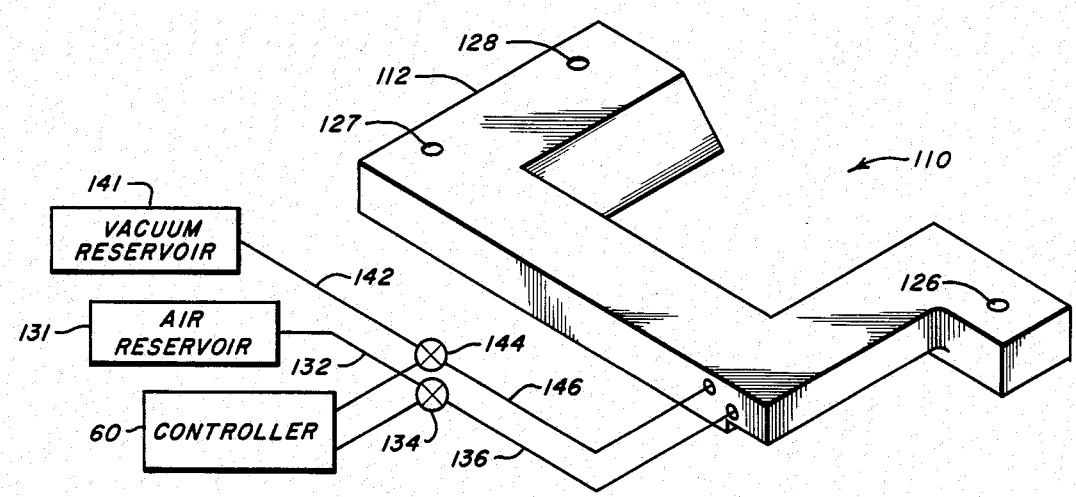
FIG. 1 shows in perspective view, an air vacuum chuck in accordance with the present invention.
Figure 2:
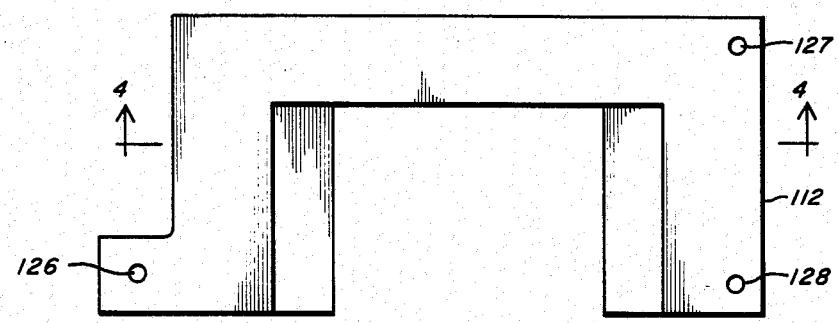
FIG. 2 shows a top view of the chuck of FIG. 1.

FIGS. 1-4 show a chuck 110 for selectively aligning, supporting, and releasing an object-bearing planar surface of a microscope slide in accordance with the present invention. Chuck 110 includes a body member 112 having a planar slide supporting surface 114. Surface 114 has three stop members 116 through 118 which extend from the slide supporting surface 114. The stop members 116-118 are positioned on surface 114 to interferingly engage the two edges of a conventional 1 inch by 3 inch microscope slide (denoted by reference designation 120 in FIGS. 3-5) and locate the slide adjacent to the slide supporting surface 114 in a predetermined orientation. In alternate forms of the invention, the stop members may extend from a fixture (not shown) attached to the objective (or other portion) of the optics system, rather than from the slide supporting surface. With this latter form, the alignment of the slide is directly related to the optical axis of the optics system. As a result, slides may readily be aligned in the same position with respect to the optical axis on different microscope systems.

The chuck 110 also includes holes 126-128 which are adapted for receiving mounting bolts for rigidly coupling chuck 110 to a microscope stage so that the surface 114 is substantially parallel to the focal plane of the microscope. The central aperture 120 is adapted to permit a microscope objective lens assembly to be adjustably lowered from the top (as shown) to position its focal plane to be coincident with surface 114. In FIG. 1, the objective lens assembly may be adjustably positioned from above (as shown) chuck 110 for focusing. Alternatively, the chuck 110 may be inverted so that the objective lens assembly may be adjustably portioned from below chuck 110 for focusing.

Chuck 110 also includes an air/vacuum slide coupler for coupling the object-bearing surface of a microscope slide to surface 114 of chuck 110. The coupler includes six air ports 130a-130f and two vacuum ports 140a and 140b in the slide supporting surface 114 of member 112. The air ports and vacuum ports are coupled by way of a respective one of passageways 150 and 152 internal to body member 112 and external tubing and valving to a respective one of relatively high pressure (e.g. 20 p.s.i.) air reservoir 131 and vacuum reservoir 141.

Figure 3:
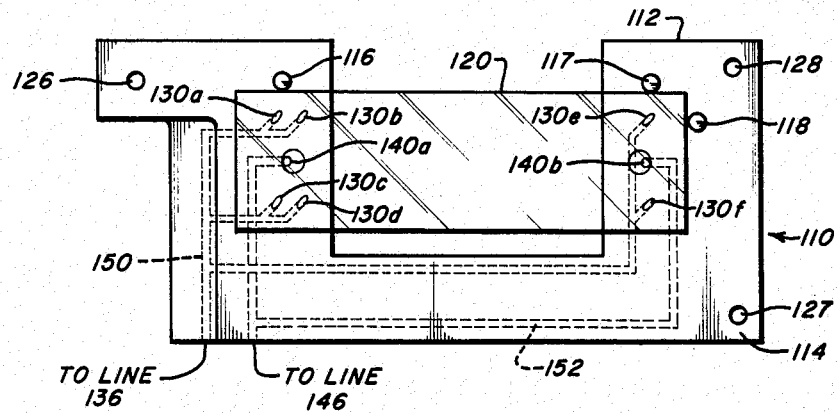
FIG. 3 shows a bottom view of the chuck of FIG. 1.
Figure 4:
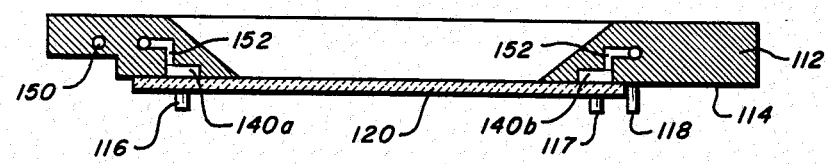
FIG. 4 shows a sectional view along line 4—4 of the body member shown in FIG. 2.

In the illustrated embodiment, air ports 130a-130f and the portions of their associated passageways adjacent to those air ports are configured so that air flow from each of those ports has a component in the direction of at least one of the stop members. In FIG. 3 the internal passageways 150 and 152 are indicated by dash lines.

As shown in FIG. 1, the high pressure air reservoir 131 is coupled to the air passageway 150 in body member 112 by way of pneumatic line 132, valve 134 and pneumatic line 136. Vacuum reservoir 141 is coupled to the vacuum passageways 152 in body member 112 by way of pneumatic line 142, valve 144, and pneumatic line 146.

A controller 160 is coupled to valves 134 and 144. Controller 160 selectively controls chuck 110 to operate in one of several modes. The mode selection may be manually or automatically controlled. Controller 160 is operative in an ALIGNMENT mode to maintain valves 134 and 144 open and in a SUPPORT mode to maintain valve 134 closed and valve 144 open. The controller 160 may also be operative in a RELEASE mode to maintain valves 134 and 144 both closed, thereby releasing the slide for off-loading. Alternatively, in this mode, valve 134 may be maintained open while valve 144 is maintained closed, or both valves may be maintained open.

With this configuration, in the ALIGNMENT mode, a microscope slide which is positioned with an object-bearing planar surface adjacent to surface 114 is coupled to that surface. In this mode, air and vacuum from ports 130a-130f and 140a-140b, respectively, establish a vacuum-retained air-bearing so that the coupling between the object-bearing surface of the slide and surface 114 is substantially frictionless. Moreover, due to the directed air flow from air ports 130a-130f, there is a net force on the slide directed towards the stop members 116-118. For example, this net force may be due to viscous drag, direct force against the slide edge, or both. In response to this net force, the slide moves towards the stop members until it rests against those members, thereby establishing a desired alignment. Typically, in operation, following alignment, controller 160 then closes valve 134, establishing the SUPPORT mode.

In the SUPPORT mode, a microscope slide which is positioned with an object-bearing surface adjacent to surface 114 may be held with that object-bearing surface against surface 114. In this mode, valve 134 is closed and vacuum at the vacuum ports 140a and 140b establishes a net force on the slide directed toward surface 114, thereby holding the slide against this surface in the aligned position. Following viewing in the SUPPORT mode, controller 160 may then close valve 144 only, or may open valve 134 and close valve 144, establishing the RELEASE mode.

The chuck 110 may be used with a microscope system. In operation, a slide which is loaded into the system (either automatically or manually) near the surface 114 of chuck 110, may be easily aligned and then held for viewing. This is accomplished by the controller 160 operating in the ALIGNMENT mode. Following alignment, the controller 160 may then operate in the SUPPORT mode. In that mode, the slide is held against surface 114 for viewing in the aligned position. Following viewing, the controller 160 may then operate in the RELEASE mode, permitting slide removal. The ALIGNMENT-SUPPORT-RELEASE cycle may then be repeated for as many slides as desired.

In the RELEASE mode, the vacuum no longer retains the slide against surface 114 and the slide is thus released, permitting off-loading. The operation of controller 160, where valve 134 is open and valve 144 is closed in the RELEASE mode, is particularly useful in forms of the invention which are inverted with respect to FIG. 1, that is the objective lens assembly is below the slide and the object-bearing surface of the slide is the lower surface of the slide. In this case, the airflow is sufficient to offset gravitational forces on the slide to release it from the slide supporting surface.

Figure 5:
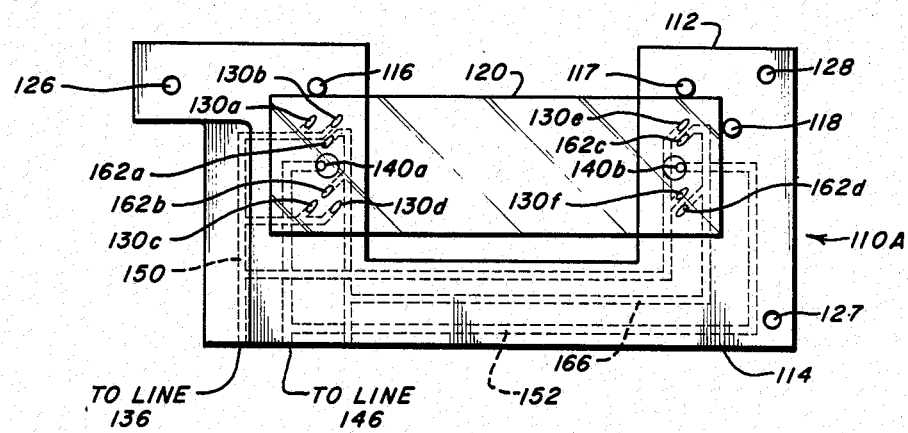
FIG. 5 shows a bottom view of an alternate embodiment of the invention.

FIG. 5 shows a bottom view of an alternate embodiment 110A of the invention. In FIG. 5 elements corresponding to elements in FIGS. 1-4 are denoted by identical reference designations. The chuck 110A is substantially the same as chuck 110 except for a plurality of air ports 162a-d and an internal air passageway 166. The ports 162a-d are adapted to direct airflow from those ports in a direction away from at least ones of the stop members 116-118. The air passageway 166 may be connected to air reservoir 131 by an air line (not shown) and valve 168 (not shown), where the valve is controlled by controller 162. In operation, valve 168 is closed in the ALIGNMENT and SUPPORT mode, and operation is the same as described above in conjunction with FIGS. 1-4. In the RELEASE mode, valve 168 is open and valve 134 is closed. Valve 144 may be open or closed. In the "non-inverted" configuration (i.e. as shown in FIG. 1) a vacuum-retained air-bearing is established between the slide and surface 114, together with a net force (imparted by the airflow from valves 160a-d) directed away from stop members 116-118, resulting in a controlled off-loading of the slide. The valve 144 may be closed in the "inverted" form, and the slide may be similarly off-loaded. Alternatively, valve 144 may be open, with the result that a vacuum-retained air-bearing is established during off-loading. In the latter form, slide bounce is minimized. The table below sets forth the effect on a slide in the various modes of operation of the chuck system for both the noninverted and inverted embodiments described above.

TABLE

| Mode | Valve 134 | Valve 144 | Effect on Slide Non-Inverted | Effect on Slide Inverted |
|---|---|---|---|---|
| ALIGNMENT | Open | Open | Slide moved to desired position | Slide moved to desired position |
| SUPPORT | Closed | Open | Slide held for viewing | Slide held for viewing |
| RELEASE | Closed | Closed | Slide falls | Slide free to move laterally only |
| RELEASE (in position) | Open | Closed | Slide falls | Slide held in desired position; can be lifted |

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A chuck system for selectively aligning and supporting an object-bearing planar surface of a microscope slide comprising:
    A. a body member having a substantially planar slide-supporting surface, and
    B. a plurality of stop members adapted to interferingly engage a slide adjacent to said slide-supporting surface with a predetermined orientation
wherein said body member includes a plurality of alignment air ports and vacuum ports in said slide-supporting surface and associated internal passageways, at least one of said air ports being adapted to direct an airflow therefrom having an alignment component directed towards at least one of said stop members.

2. A chuck system according to claim 1 further comprising slide control means including:
    i. alignment air means selectively operable for coupling air from a relatively high pressure air reservoir to said alignment air ports,
    ii. vacuum means selectively operable for coupling a vacuum from a vacuum reservoir to said vacuum ports,
    iii. controller including means operable
        in an ALIGNMENT mode for
        actuating said alignment air means and said vacuum means whereby the airflow from said alignment air ports establishes a substantially frictionless coupling between a slide adjacent to said slide-supporting surface and that surface, and the vacuum from said vacuum ports establishes an equilibrium force on said slide maintaining a predetermined uniform separation between said slide and said slide-supporting surface,
        and said airflow alignment component imparts a net force on said slide in a plane parallel to said slide-supporting surface and towards at least one of said stop members, and
        in a SUPPORT mode for
        actuating said vacuum means and maintaining said alignment air means inoperative, whereby the vacuum from said vacuum ports establishes a net force on a slide adjacent to said slide-supporting surface directed toward that surface.

3. A chuck system according to claim 2 wherein said controller further includes means operable in a RELEASE mode for
    actuating said alignment air means and maintaining said vacuum means inoperative whereby the airflow from said alignment air ports maintains a net force on a slide adjacent to said slide-supporting surface directed away from that surface.

4. A chuck system according to claim 2 wherein said controller further includes means operable in a RELEASE mode for
    actuating said alignment air means and said vacuum means whereby the airflow from said alignment air ports establishes a substantially frictionless coupling between a slide adjacent to said slide-supporting surface and that surface,
    and the vacuum from said vacuum ports establishes an equilibrium force on said slide maintaining a predetermined uniform separation between said slide and said slide-supporting surface,
    and said airflow alignment component imparts a net force on said slide in a plane parallel to said slide-supporting surface and towards at least one of said stop members.

5. A chuck system according to claim 1 wherein said body member further includes at least one release air port in said slide-supporting surface and associated internal passageways adapted to direct an airflow therefrom having a release component directed away from at least one of said stop members.

6. A chuck system according to claim 5 further comprising slide control means including:
    i. alignment air means selectively operable for coupling air from a relatively high pressure air reservoir to said alignment air ports, ii. release air means selectively operable for coupling air from a relatively high pressure air reservoir to said release air ports,
iii. vacuum means selectively operable for coupling a vacuum from a vacuum reservoir to said vacuum ports,
iv. controller including means operable
   in an ALIGNMENT mode for
   actuating said alignment air means and said vacuum means and maintaining said release means inoperative, whereby the airflow from said alignment air ports establishes a substantially frictionless coupling between a slide adjacent to said slide-supporting surface and that surface, and the vacuum from said vacuum ports establishes an equilibrium force on said slide maintaining a predetermined uniform separation between said slide and said slide-supporting surface,
   and said airflow alignment component imparts a net force on said slide in a plane parallel to said slide-supporting surface and towards at least one of said stop members,
   in a SUPPORT mode for
   actuating said vacuum means and maintaining said alignment air means and said release air means inoperative, whereby the vacuum from said vacuum ports establishes a net force on a slide adjacent to said slide supporting surface directed toward that surface, and
   in a RELEASE mode
   actuating said release air means and said vacuum means and maintaining said alignment air means inoperative, whereby the airflow from said release air ports establishes a substantially frictionless coupling between a slide adjacent to said slide-supporting surface and that surface, and
   the vacuum from said vacuum ports establishes an equilibrium force on said slide maintaining a predetermined uniform separation between said slide and said slide-supporting surface
   and said airflow release component imparts a net force on said slide in a plane parallel to said slide-supporting surface and away from at least one of said stop members.

7. A chuck system according to claim 5 further comprising slide control means including:
   i. alignment air means selectively operable for coupling air from a relatively high pressure air reservoir to said alignment air ports,
   ii. release air means selectively operable for coupling air from a relatively high pressure air reservoir to said release air ports,
   iii. vacuum means selectively operable for coupling a vacuum from a vacuum reservoir to said vacuum ports,
   iv. controller including means operable in an ALIGNMENT mode for
   actuating said alignment air means and said vacuum means and maintaining said release means inoperative, whereby the airflow from said alignment air ports establishes a substantially frictionless coupling between a slide adjacent to said slide-supporting surface and that surface, and the vacuum from said vacuum ports establishes an equilibrium force on said slide maintaining a predetermined uniform separation between said slide and said slide-supporting surface,
   and said airflow alignment component imparts a net force on said slide in a plane parallel to said slide-supporting surface and towards at least one of said stop members,
   in a SUPPORT mode for
   actuating said vacuum means and maintaining said alignment air means and said release air means inoperative, whereby the vacuum from said vacuum ports establishes a net force on a slide adjacent to said slide supporting surface directed toward that surface, and
   in a RELEASE mode
   actuating said release air and maintaining said alignment air means and said vacuum means inoperative, whereby the airflow from said release air ports establishes a substantially frictionless coupling between a slide adjacent to said slide-supporting surface and that surface, and
   said airflow release component imparts a net force on said slide in a plane parallel to said slide-supporting surface and away from at least one of said stop members.

8. A chuck system according to claim 1 wherein said stop members are affixed to and extend from said slide-supporting surface.

9. A chuck system according to claim 1 further including a support member affixed to the optics system of an associated microscope wherein said stop members extend from said support member.

10. A chuck system according to claim 5 wherein said stop members are affixed to and extend from said slide-supporting surface.

11. A chuck system according to claim 5 further including a support member affixed to the optics system of an associated microscope wherein said stop members extend from said support member.

* * * * *

UNITED STATES PATENT AND TRADEMARK OFFICE
CERTIFICATE OF CORRECTION

PATENT NO. : 4,508,435

DATED : April 2, 1985

INVENTOR(S) : Marshall Donnie Graham, Dudley David Cook, Jr. Donald Louis Gecks and Robert Shaw It is certified that error appears in the above-identified patent and that said Letters Patent is hereby corrected as shown below:

Column 3, line 38; delete "120".

Column 3, line 45; change "portioned" to read --positioned--.

Column 5, line 8; change "ones" to read --one--.

Column 5, line 12; change "162" to read --60--.

Column 5, line 21; change "valves 160a-d" to read --ports 162a-d--.

Column 4, lines 3,4,6,10,32,42,49,51,54,61: change "160" to read --60--.

Signed and Sealed this

Twenty-sixth Day of August 1986

[SEAL]

Attest:

Attesting Officer

DONALD J. QUIGG

Commissioner of Patents and Trademarks